United States Patent [19]
Miyashita et al.

[11] Patent Number: 5,993,639
[45] Date of Patent: Nov. 30, 1999

[54] METHOD FOR PRODUCING ELECTROLYTIC IONIC WATER AND AN APPARATUS FOR THE SAME

[75] Inventors: Naoto Miyashita; Masahiro Abe, both of Kanagawa-ken, Japan

[73] Assignee: Kabushiki Kaisha Toshiba, Kawasaki, Japan

[21] Appl. No.: 08/969,445

[22] Filed: Nov. 13, 1997

[30] Foreign Application Priority Data

Nov. 14, 1996 [JP] Japan ................................ P08-303066

[51] Int. Cl.[6] ...................................................... C02F 1/461
[52] U.S. Cl. ........................... 205/742; 205/746; 204/257; 204/262
[58] Field of Search ..................... 204/257, 262, 204/294, 290 F, 292; 205/746, 751, 464

[56] References Cited

U.S. PATENT DOCUMENTS

| | | | |
|---|---|---|---|
| 3,649,509 | 3/1972 | Morawetz et al. | 204/238 |
| 4,152,215 | 5/1979 | Yoshino et al. | 195/127 |
| 4,198,294 | 4/1980 | Deane | 210/23 |
| 5,616,221 | 4/1997 | Aoki et al. | 204/252 |
| 5,858,202 | 1/1999 | Nakamura et al. | 205/746 |

*Primary Examiner*—Arun S. Phasge
*Assistant Examiner*—Erica Smith-Hicks
*Attorney, Agent, or Firm*—Banner & Witcoff, Ltd.

[57] ABSTRACT

An electrolytic ionic water generating apparatus that produces electrolytic ionic water having a desired pH value and a semiconductor manufacturing apparatus that uses the electrolytic ionic water. The invention includes an electrolytic tank with an anode chamber and a cathode chamber, an introducing conduit or line to introduce electrolytic solution, and a discharge conduit or line to supply the generated electrolytic ionic water to other apparatuses such as a semiconductor washing machine and a semiconductor polishing machine. To control the pH value of the electrolyzed ionic water, pH meters and pH controllers are disposed on the introducing or discharge conduit. The pH meters detect the pH values of the electrolyzed ionic water and provide the detected result to the pH controllers. The pH controllers control the pH values of the supplied ionic water by controlling and changing the temperature of the solution.

30 Claims, 13 Drawing Sheets

METHOD FOR PRODUCING ELECTROLYTIC IONIC WATER AND AN APPARATUS FOR THE SAME

BACKGROUND OF THE INVENTION

1. Field of the Invention

The present invention relates to a method for producing electrolytic ionic water and an apparatus for producing electrolytic ionic water, as well as a semiconductor manufacturing apparatus using this electrolytic ionic water for washing semiconductor substrates. In particular, this invention relates to a method for producing electrolytic ionic water by adjusting the pH.

2. Description of the Related Art

Electrolytic ionic water is widely used in various fields, in particular, in the manufacturing of semiconductor devices or liquid crystal displays. In particular, electrolytic ionic water obtained from electrolyzed pure water or ultra pure water is used during the manufacturing of semiconductors for washing and polishing.

Conventionally, fluorocarbon solvents, such as $CCl_3F$, have been used for washing semiconductor substrates during the manufacturing process. However, fluorine solvents may adversely affect the environment and sometimes are to be avoided. Thus, pure water or ultra pure water is often used as a safer solvent.

Pure water is high purity water having a specific resistance of 5 $M\Omega cm$ to 18 $M\Omega cm$ where impurities such as ions, fine grains, microorganisms, organic matters have been removed. Ultra pure water is extremely highly purified pure water, and has a specific resistance higher than 18 $M\Omega cm$ When pure water or ultrapure water (hereinafter, both referred to as pure water) is electrolyzed, the resulting product is electrolytic ionic water such as an anode ionic water, which is strongly oxidized (acidic water), and cathode ionic water, which is strongly basic or reduced (alkaline water).

A conventional electrolytic bath of an electrolytic ionic water generating apparatus has a cathode chamber and an anode chamber. A cathode is disposed in the cathode chamber and an anode is disposed in the anode chamber. The cathode and the anode, both electrodes, are made of metals such as platinum or titanium. In order to efficiently separate cathode ionic water generated in the cathode chamber and anode ionic water generated in the anode chamber, the cathode chamber and the anode chamber are partitioned by a porous membrane made of a ceramic material or a macromolecule. The cathode and the anode are connected to a direct current power source.

Diluted electrolytic solution of a particular pH value is prepared by diluting a supporting electrolyte or electrolytic solution, such as hydrochloric acid (HCl), nitric acid ($HNO_3$), ammonium chloride ($NH_4Cl$), or ammonia ($NH_3$), with pure water in an electrolytic bath. The solution is electrolyzed in the electrolytic bath by impressing a voltage from the power source. As noted, normally, the cathode ionic water generated in the cathode chamber is alkaline water and anode ionic water generated in the anode chamber is acidic water.

The cathode ionic water generated in the cathode chamber is supplied to an external apparatus through a cathode ionic water discharge line, while the anode ionic water generated in the anode chamber is supplied to an external apparatus through an anode ionic water discharge line.

When alkaline water is used, for example, in a polishing apparatus for manufacturing semiconductor devices, the cathode ionic water is supplied from the cathode chamber, and the acid water generated in the anode chamber is disposed from the anode ionic water discharge line. Similarly, when acid water is used in, for example, a polishing device, the anode ionic water is supplied from the anode chamber, and the alkaline ionic water generated in the cathode chamber is disposed of via the cathode ionic water discharge line. Thus, the electrolytic ionic water generating system can be applied to semiconductor manufacturing apparatuses such as polishing machines and washing wafers machines.

Under conventional methods, the pH value of electrolytic ionic water is regulated by controlling the concentration of the supporting electrolyte in the electrolyte solution or the amount of the current applied to the electrodes in the electrolytic bath. However, it is very difficult to regulate and maintain the desired pH values due to the heat generated by the electrolysis process. Further, a conventional electrolysis apparatus does not have a heat controller and typically can only operate at about room temperature.

SUMMARY OF THE INVENTION

An object of the present invention is to provide an electrolytic ionic water generating method and apparatus capable of generating electrolytic ionic water having desired pH values. Another object of the present invention is a semiconductor manufacturing method and apparatus having a highly effective cleaning system using the electrolytic ionic water.

An apparatus according to the present invention has a pH controller including a temperature controller that monitors the output of a pH detector. Because the pH value depends on the temperature of the solution, the pH value can be controlled by controlling the temperature.

The present invention also includes an apparatus for producing electrolyzed ionic water comprising a first introducing line to introduce a first electrolytic solution at an electrolytic tank, a second introducing line to introduce a second electrolytic solution at the electrolytic tank, a first discharge line to supply electrolyzed anode ionic water at the electrolytic tank, a second discharge line to supply electrolyzed cathode ionic water at the electrolytic tank. The apparatus further includes a pair of electrodes in the electrolytic tank, a barrier membrane between the electrodes, and a power supply source connected to the electrodes. The power supply supplies a direct current. Additionally, the apparatus includes a first pH meter on the first introducing line, a second pH meter on the second introducing line, a first pH controller on the first introducing line downstream of the first pH meter, receiving data from the first pH meter, and a second pH controller on the second introducing line downstream of the second pH meter, receiving data from the second pH meter. The first pH controller changes the temperature of the electrolyzed anode ionic water, based on the data from the first pH meter based on the estimated heat of the electrolysis. Similarly, the second pH controller changes the temperature of the electrolyzed cathode ionic water, based on the data from the second pH meter and based on the estimated heat of the electrolysis.

The present invention also provides a method for producing electrolyzed ionic water, comprising the steps of detecting the pH value of electrolyzed ionic water, and changing the temperature of the electrolyzed ionic water based on the result of the detecting step.

Furthermore, the present invention provides a method for producing electrolyzed ionic water using an electrolytic tank having a discharge line to supply the electrolyzed ionic water to an external apparatus, a pH meter on the discharge line and a pH controller, comprising the steps of detecting a pH value of the electrolyzed ionic water on the discharge line by the pH meter, and changing the temperature of the electrolyzed ionic water with the pH controller based on the result of the detecting step.

The present invention further provides an apparatus for manufacturing a semiconductor device comprising a first introducing line to introduce a first electrolytic solution to an electrolytic tank and a second introducing line to introduce a second electrolytic solution to the electrolytic tank. The apparatus additionally incudes a first discharge line to supply electrolyzed anode ionic water at the electrolytic tank, a second discharge line to supply electrolyzed cathode ionic water at the electrolytic tank and a pair of electrodes in the electrolytic tank. Furthermore, the apparatus includes a barrier membrane between the electrodes and a power supply source connected to the electrodes, supplying a direct current. The apparatus also includes a first pH meter on the first discharge line, a second pH meter on the second discharge line, and a first pH controller on the first discharge line downstream from the first pH meter, receiving data from the first pH meter. Similarly, the apparatus includes a second pH controller on the second discharge line downstream from the second pH meter, receiving data from the second pH meter. The invention also includes a washing tank connected to the first discharge line and the second discharge line.

DETAILED DESCRIPTION OF THE PREFERRED EMBODIMENTS

The present invention features an apparatus for producing electrolytic ionic water that is equipped with a pH control apparatus. The electrolytic ionic water produced by the apparatus is supplied to a semiconductor manufacturing apparatus such as a washing wafer machine or a polishing machine. To control the pH of the electrolytic ionic water, a pH control apparatus includes a temperature controller.

Figure 1:
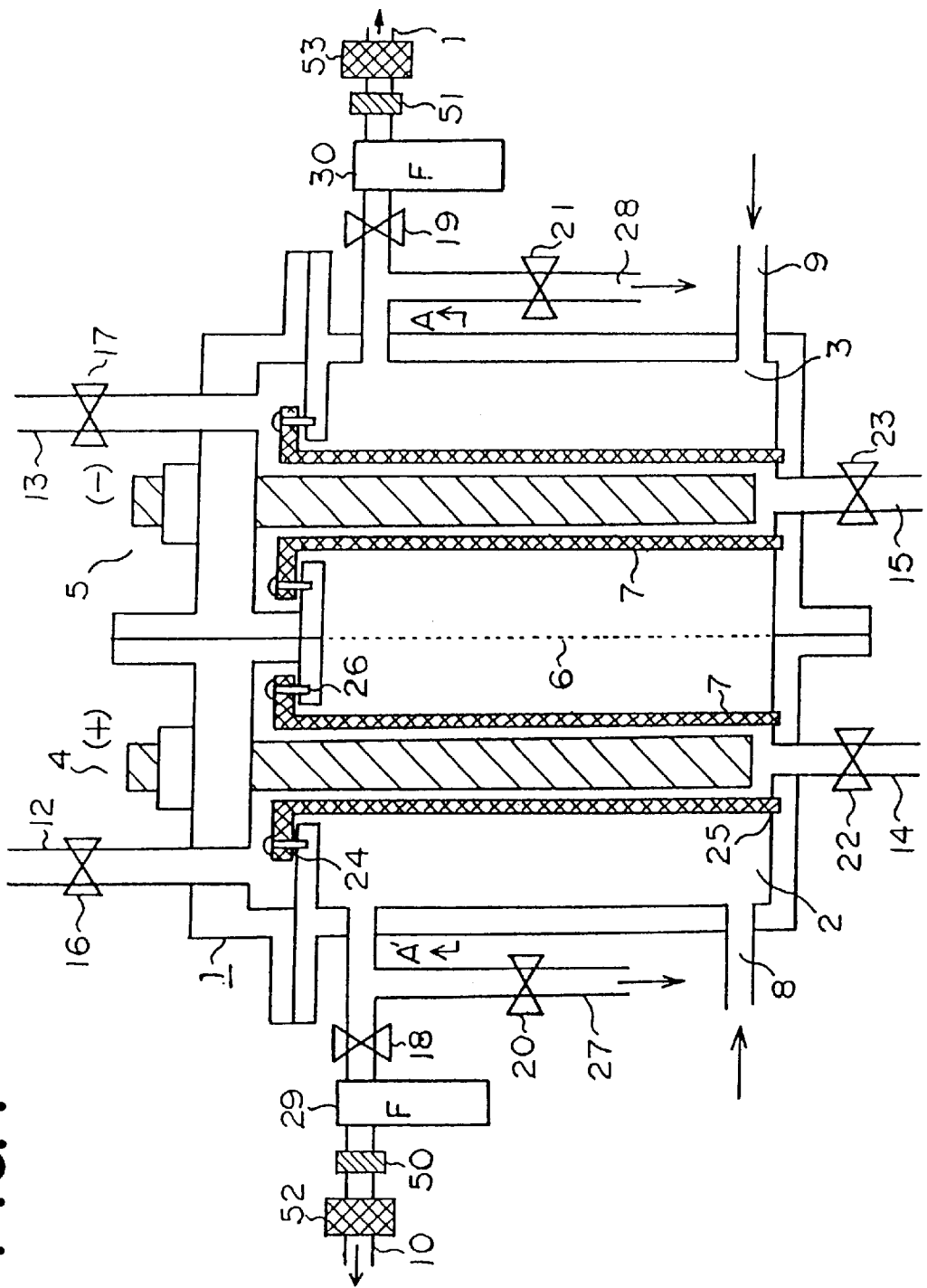
FIG. 1 is a sectional view of an electrolytic tank of an electrolytic ionic water generating apparatus of the present invention.

FIG. 1 is a schematic sectional view of an electrolytic tank of an electrolytic ionic water generating apparatus using carbon electrodes (an anode and a cathode). An electrolytic tank 1 is divided into an anode chamber 2 and a cathode chamber 3. The chambers are separated by an ion exchange membrane 6.

The electrolytic tank 1 has one or more pairs of electrodes 4, 5 made from, for example, carbon. The anode 4 is disposed in the anode chamber 2 and the cathode 5 is disposed in the cathode chamber 3. One end of the anode 4 and of the cathode 5 are fixed to the lid of the electrolytic tank 1. A first introducing line or conduit 8 is connected to the anode chamber 2 while a second introducing line or conduit 9 is connected to the cathode chamber 3. The electrolytic tank 1 is in a square shape of for instance, 10 cm×10 cm to 30 cm×30 cm and is about 20 cm–50 cm high. Although not illustrated, the anode 4 is connected to a positive pole of a power source and the cathode 5 is connected to a negative pole of the power source.

Pure water with added supporting electrolyte is supplied to the electrolytic tank 1 at the bottom through introducing lines or conduits 8, 9. Electrolytic ionic water is generated from the pure water with supporting electrolyte added, that is, electrolyte solution, by applying about 10 V–20 V between the electrodes 4 and 5. Acid water is generated in the anode chamber 2 and alkaline water is generated in the cathode chamber 3.

In one preferred embodiment, the electrolyte concentration in the anode chamber 2 is 1,000 ppm (parts per million) to 100,000 ppm of hydrochloric acid and the electrolyte concentration in the cathode chamber 3 is 10 ppm–500 ppm of ammonia. To increase conductivity, 10 ppm–500 ppm of hydrochloric acid may be added to electrolyte solution in the cathode chamber 3. The concentration of the hydrochloric acid added depends on the concentration of the ammonia. The pH of the electrolyte solution is regulated so that it is maintained at a level of about 8–9.

A first discharge line or conduit 10 is formed at the anode chamber 2 to supply the acidic water, and a second discharge line or conduit 11 is formed at the cathode chamber 3 to supply the alkaline water. The electrolyzed ionic water is supplied to machines such as a semiconductor manufacturing apparatus through the discharge lines 10, 11. In this situation, electrolyzing valves 18, 19 on the discharge lines 10, 11 are opened and valves 20, 21 on a first supply branch line 27 and a second supply branch line 28 are closed.

PH meters 50, 51 measure the pH of electrolytic ionic water. PH controllers 52, 53 are disposed on the discharge lines 10, 11 and control the pH of electrolytic ionic water. The pH controllers 52, 53 comprise temperature controllers. The data from the pH meters 50, 51 is provided to the pH controllers 52, 53 respectively and the pH controllers 52, 53 regulate the temperature of the electrolytic ionic water in the discharge lines 10, 11 based on the data from the pH meters 50, 51.

Figure 2:
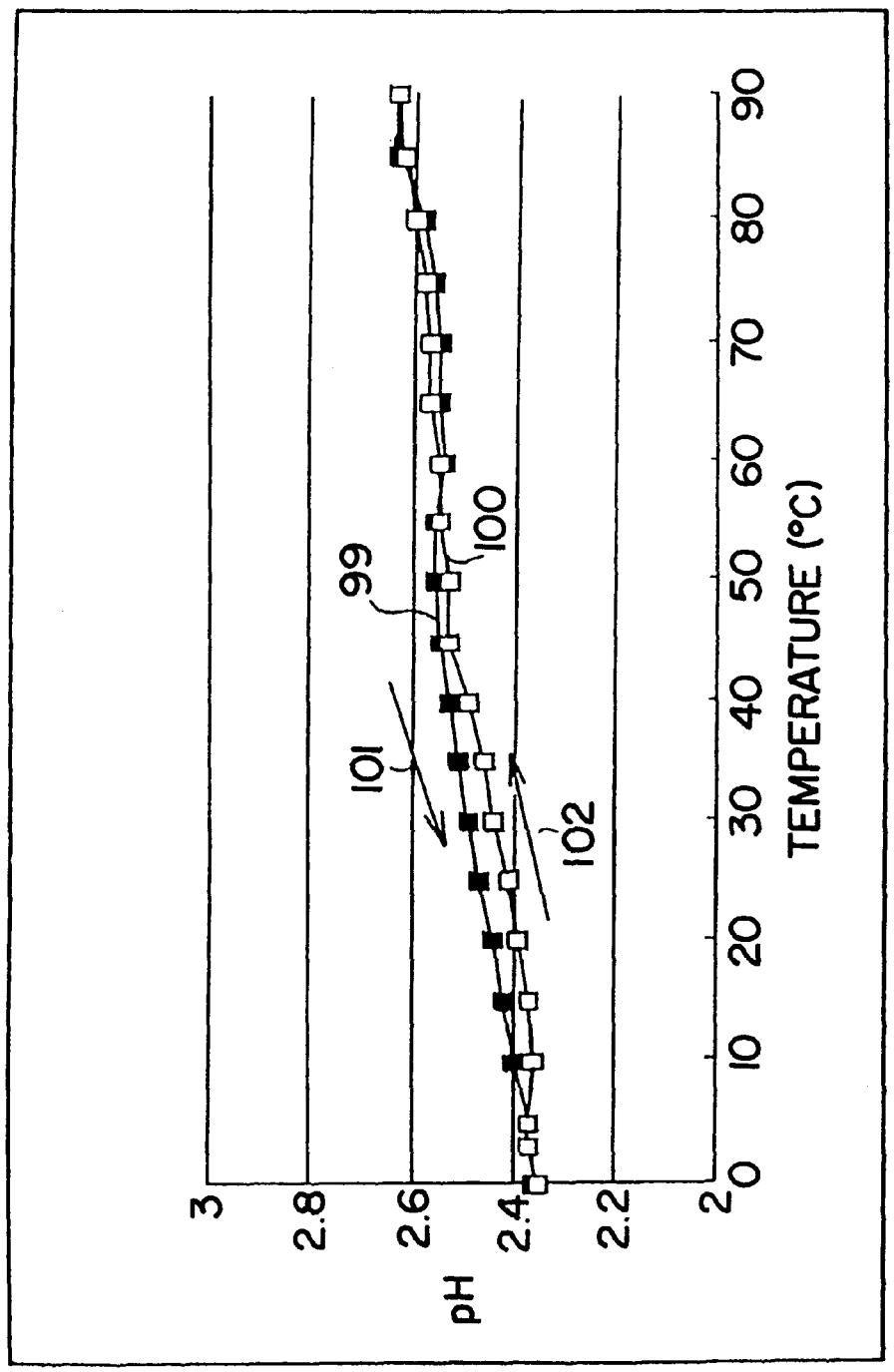
FIG. 2 is a characteristic diagram showing the temperature dependency of pH of acid water.

FIG. 2 shows the variation of the pH of acid water depending on temperature. The vertical axis represents pH values and the horizontal axis represents temperature (° C.). A curve 99 plotted by solid squares illustrates pH values while lowering the temperature of the acid water. A curve 100 plotted by outline squares illustrates pH values while raising the temperature of the acid water. Arrows 101, 102 show the respective measuring directions. The curves 99, 100 are not identical, that is, the pH value has a hysteresis characteristic.

Figure 3:
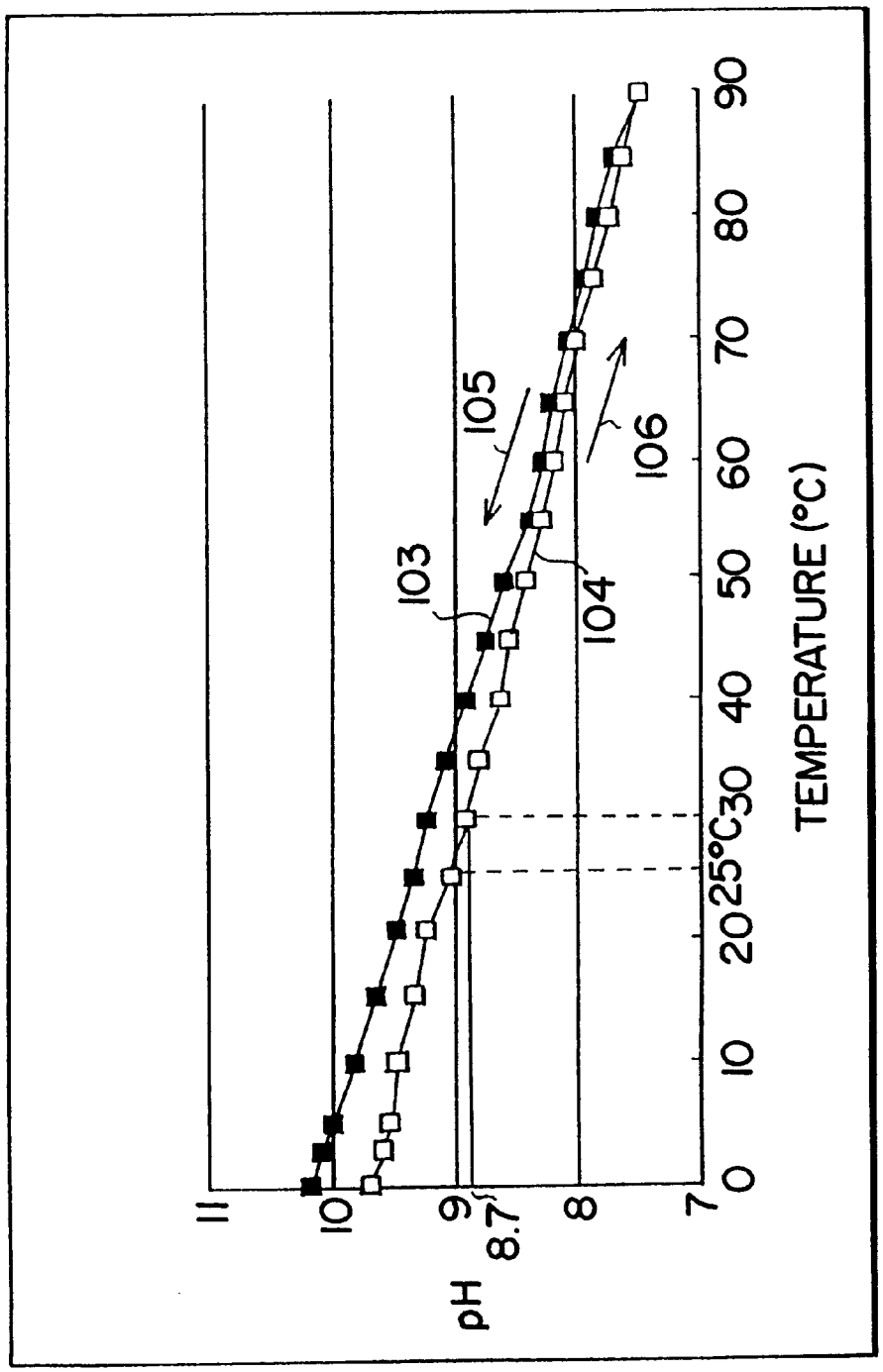
FIG. 3 is a characteristic diagram showing the temperature dependency of pH of alkaline water.

FIG. 3 shows the temperature dependency of pH of alkaline water. The vertical axis represents pH values and the horizontal axis represents temperatures (° C.). The curve 103 plotted by black solid squares illustrates pH values while lowering the temperature of alkaline water. A curve 104 plotted by outline squares illustrates pH values while raising the temperature of alkaline water. Arrows 105, 106 show the measuring direction. The curves 103, 104 are not identical, that is the pH value has a hysteresis characteristic. The hysteresis characteristic for alkaline water is larger than that of acidic water.

For example, alkaline water of pH 9 is obtained when the temperature of the alkaline water is 25° C. according to the curve 104. However, even when the electrolysis is carried out starting at 25° C., alkaline water of pH 9 cannot be obtained because the electrolysis produces heat and disturbs the heat balance in the tank. If the temperature raises 5° C. during the electrolysis, the pH becomes 8.7, which is lower than the set value. Therefore, lowering the temperature of the alkaline water by 5° C. using a temperature controller such as a heat exchanger results in alkaline water of pH 9.

Thus, electrolytic ionic water of a particular pH can be obtained by controlling the temperature of acid or alkaline water even in an electrolysis conditions without controlling the concentration of the electrolyte.

Figure 4A:
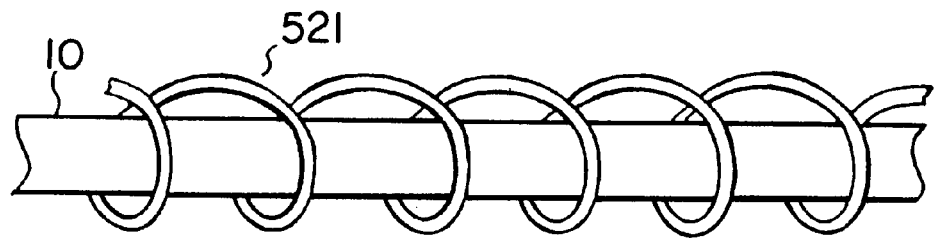
FIGS. 4(a), 4(b), 5(a) and 5(b) are sectional views of temperature controllers of the present invention.
Figure 4B:
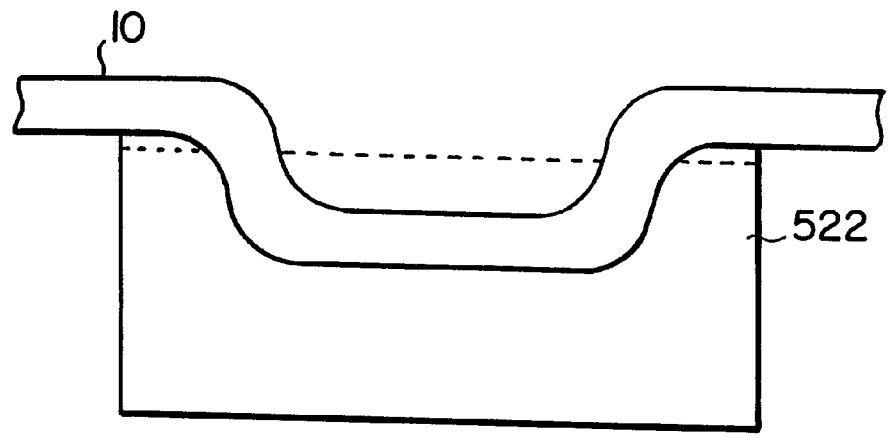
Figure 5A:
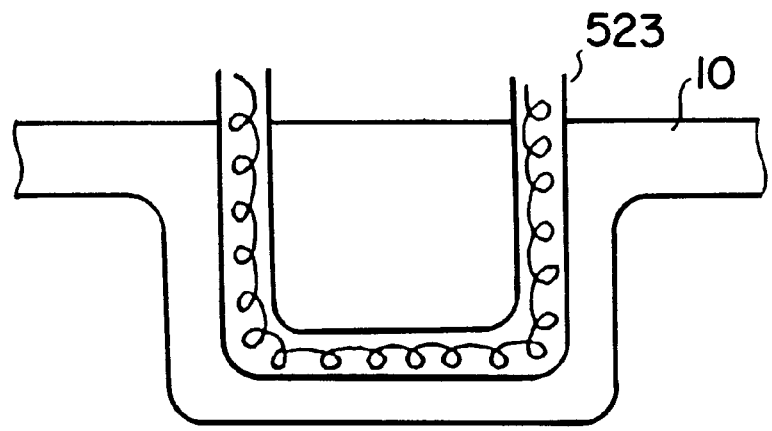
Figure 5B:
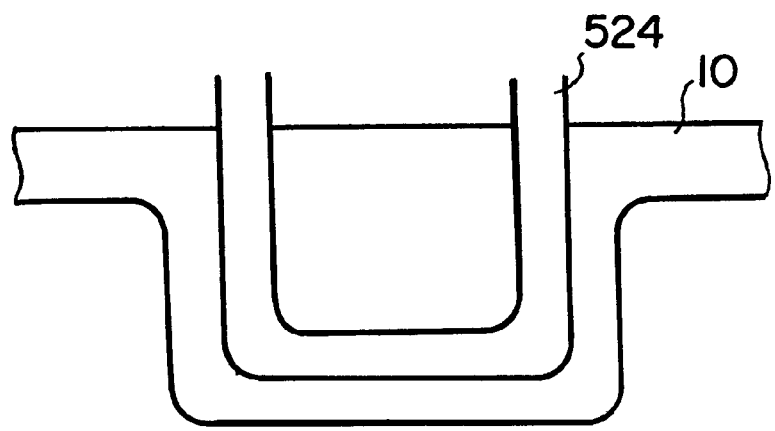

FIGS. 4(*a*), 4(*b*), 5(*a*) and 5(*b*) are sectional views of temperature controllers included in the pH controllers 52, 53. The temperature controller may consist of a resistance coil 521 wound around the discharge line 10 (FIG. 4(*a*)), or a cooling or heating medium 522 surrounding the discharge line 10 (FIG. 4(*b*)), or a resistance coil 523 in a quartz or silicon carbide (SiC) tube in the discharge line 10 (FIG. 5(*a*)), or a cooling or heating medium 524 passing through a quartz or SiC tube (FIG. 5(*b*)).

Figure 6A:
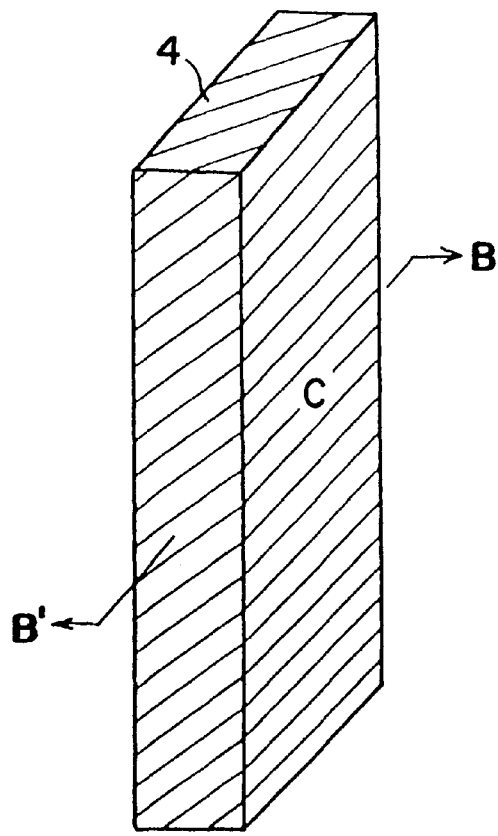
FIG. 6(a) is a perspective view of a carbon electrode.
Figure 6B:
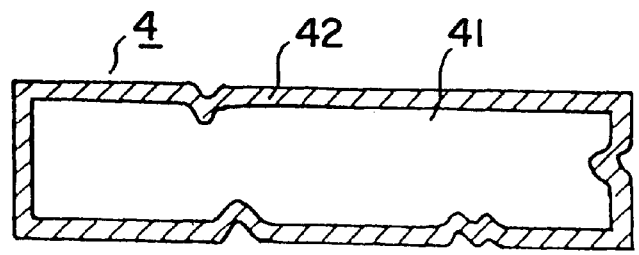
FIG. 6(b) is a partial sectional view along the B-B' line of FIG. 6(a).

FIGS. 6(*a*) and 6(*b*) are perspective and partial side views, respectively of a carbon electrode 4. The carbon electrode 4 is made from crystalline carbon such as graphite in a plate shape, heated at a temperature of about 1000° C. to about 1200° C. for several hours to several hundred hours. The carbon electrode 4 includes a fired carbon block 41 that is porous and has irregularities at its surface. The block 41 is dipped for a time period of from several hours to about three days in an amorphous carbon bath that is filled with carbon in an organic solvent under a reduced-pressure atmosphere. The dipping time depends on the size of the block 41. The carbon in the organic solvent penetrates into the center of the block 41. The block 41 is then baked at the temperature of about 2000° C.–about 3000° C. for about one day to about three days. The resulting carbon coating layer 42 has a crystalline structure that is distinct from the crystalline structure of the carbon block. Because the carbon coating layer 42 is adhered along the irregularities of the block 41 surface, it strengthens the bonds between the carbon elements and prevents carbon fragments from detaching. Further, the carbon in the solvent fills in the pores in the block 41. Thus, the ratio of pores in the block 41 is improved to about 10% from about 14%, and the density changes to about 1.86 g/cm$^3$ from 1.55 g/cm$^3$. The thickness of the carbon coating layer 42 is about 0.01 μm to several microns. Another method for forming the carbon coating layer 42 is a reduced-pressure CVD or vacuum vapor deposition or the like.

Figure 7:
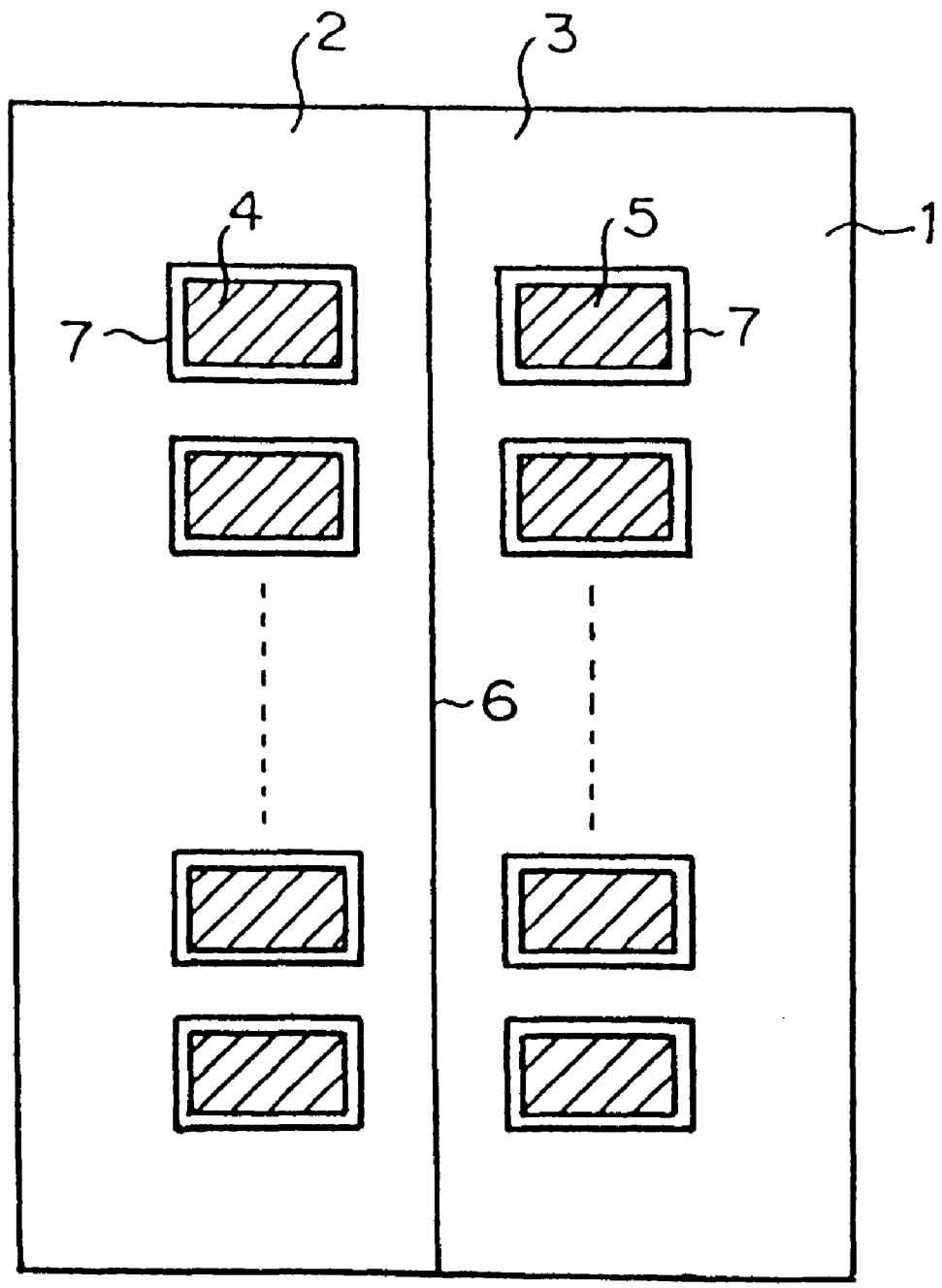
FIG. 7 is a sectional view of the part along the A-A' line of an electrolytic tank shown in FIG. 1.

FIG. 7 is a sectional view along the line A-A' in FIG. 1. The invention may include multiple carbon electrodes 4, 5. Each carbon electrode 4, 5 in the electrolytic tank 1 may be covered by a filter 7. The purpose of the filter 7 is to remove particles from the carbon electrodes 4, 5 and to prevent these particles from dispersing into the generated electrolytic ionic water. Therefore, the carbon electrodes 4, 5 may be surrounded respectively by the filter 7 as shown in FIG. 7, or surrounded altogether by a filter. Filters 29, 30 may also be disposed in the discharge lines 10, 11.

The filter 7 is a highly clean filter made from pure silica. For example, the filter 7 can be a ceramic filter or a dry filter, which is formed from quartz, and consists of three layers in different quartz particle diameters. The filter 7 may be made from Teflon.

There is a space of about 3 mm to about 10 mm between the electrodes and the filter. The filter 7 and the electrolytic tank 1 are joined by a screw 26 with packings or gaskets 24, 25. Although carbon particles may loosen and disperse from the carbon electrodes 4, 5 as a result of the electrolysis, the carbon particles are caught by the filter 7. Thus, carbon particles are filtered from the electrolytic ionic water.

Although the carbon particles in the electrolytic ionic water can be significantly reduced depending on the structure of the electrodes 4, 5, nonetheless carbon particles are left in the filter 7 after a long period of electrolysis. To remove these carbon particles, cleaning pure water discharge lines 12, 13 and cleaning discharge lines 14, 15 are disposed at the electrolytic tank 1 as shown in FIG. 1.

When cleaning the inside of the filter 7, the electrolysis is stopped and the valves 18, 19 of the discharge lines 10, 11 are closed. Then, the valves 16, 17 on the cleaning pure water discharge lines 12, 13, the valves 20, 21 on the first and the second supply branch lines 27, 28 and the valves 22, 23 on the cleaning discharge lines 14, 15 are opened.

After cleaning, the valves 16, 17, 20–23 are closed, and the valves 18, 19 on the discharge lines 10, 11 are opened, and the electrolysis in the electrolytic tank 1 continues.

If carbon electrodes without the coating are used, the surface of the anode is oxidized, generating carbon dioxide ($CO_2$), such that carbon particles are dispersed into the electrolytic ionic water. Electrodes used in the present invention have a carbon body with carbon coat layer. Since carbon particle cannot be avoided so long as carbon electrodes are used, filters are employed in the invention.

Figure 8:
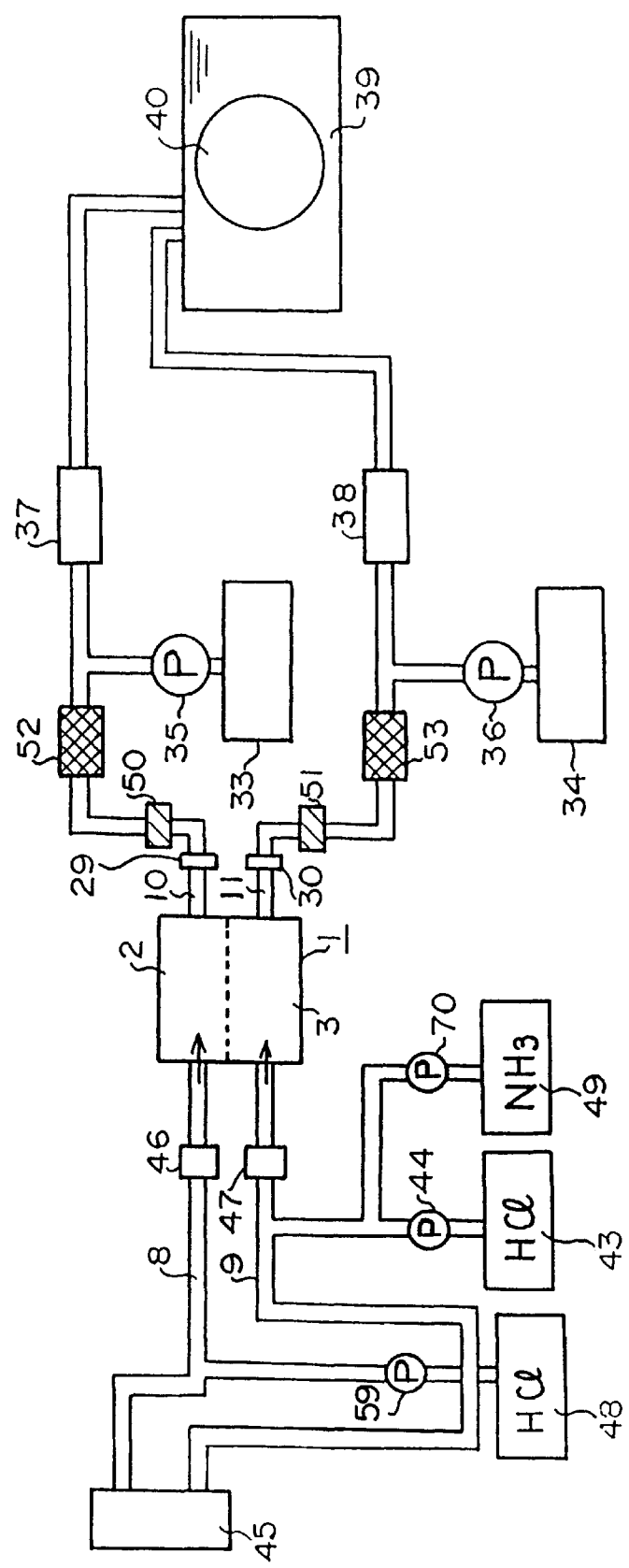
FIG. 8 is a schematic system diagram of an electrolytic ionic water generating apparatus and a cleaning device of the present invention.

FIG. 8 shows an example of a system diagram of a semiconductor manufacturing apparatus for washing semiconductor substrates using the electrolytic ionic water generating apparatus. This system includes a pure water tank 45. The electrolytic ionic water generating apparatus includes the electrolytic tank 1 and a semiconductor substrate washing tank 39. The cleaning water discharge lines and the cleaning discharge lines are omitted in FIG. 8 since they are not directly related to the semiconductor washing process.

The introducing lines 8, 9 are connected to the pure water tank 45. An electrolyte solution is produced by mixing hydrochloric acid (HCl) supplied via a pump 59 from an electrolyte solution tank 48 with the pure water from the pure water tank 45 in a mixer 46. The electrolyte solution is then introduced into the anode chamber 2 in the electrolytic tank 1. Alternatively, after an electrolyte solution is produced by mixing ammonia ($NH_3$) supplied via a pump 70 from an electrolytic solution tank 49 and hydrochloric acid (HCl) supplied via a pump 44 from an electrolytic solution tank 43 with the pure water from the pure water tank 45 in a mixer 47, the electrolyte solution is introduced into the cathode chamber 3.

The discharge lines 10, 11 are connected to the semiconductor substrate washing tank 39. The semiconductor substrate 40 is washed in the semiconductor substrate washing tank 39 by the acid water from the first discharge line 10 or the alkaline water from the second discharge line 11.

In order to control pH of electrolytic ionic water, pH meters 50, 51 are provided for measuring the pH of electrolytic ionic water, and pH controllers 52, 53 are provided for controlling the pH of electrolytic ionic water in the discharge lines 10, 11. The pH of the generated electrolytic ionic water is measured by the pH meters 50, 51. The data from the pH meters 50, 51 is provided to the pH controllers 52, 53. To regulate the pH of the electrolytic ionic water and maintain the pH at a desired value, the temperature of the electrolytic ionic water is controlled in accordance with the data from the pH meters 50, 51.

Acid water is used in combination with chemicals such as fluoric acid, nitric acid, and hydrochloric acid to improve efficiency in removing particles and metallic contaminants on a semiconductor substrate. Alkaline water is used in combination with chemicals or surfactants. A preferred concentration of chemicals is about 0.1 wt % to about 5 wt %. These chemicals are supplied from chemical tanks 33, 34 by pumps 35, 36. For example, hydrochloric acid or ammonia is stocked in the chemical solution tank 33 and a surfactant in the chemical tank 34. The electrolytic ionic water is uniformly mixed with the chemicals by mixers 37, 38 and is supplied to the semiconductor substrate washing tank 39.

Although hydrofluoric acid (HF) cannot be used as a supporting electrolyte with metal electrodes in the electrolytic tank because the metal electrodes are eroded by the HF, HF can be used with carbon electrodes for the electrolytic ionic water generating apparatus.

The electrolytic solution that includes HF is supplied to the electrolytic tank 1 from the introducing lines 8, 9. The electrolytic ionic water including HF, which includes an HF ion as well as a hydrogen ion and oxygen ion, possesses improved oxidation potential or reduction potential in comparison with normal HF water, in other words non-ionic water including HF. Therefore, contaminants such as copper (Cu), which are not removable with normal HF water, can be removed by acid water generated at the anode chamber with HF. When HF is used as the supporting electrolyte, the filter 7 is preferably made from Teflon.

Figure 9:
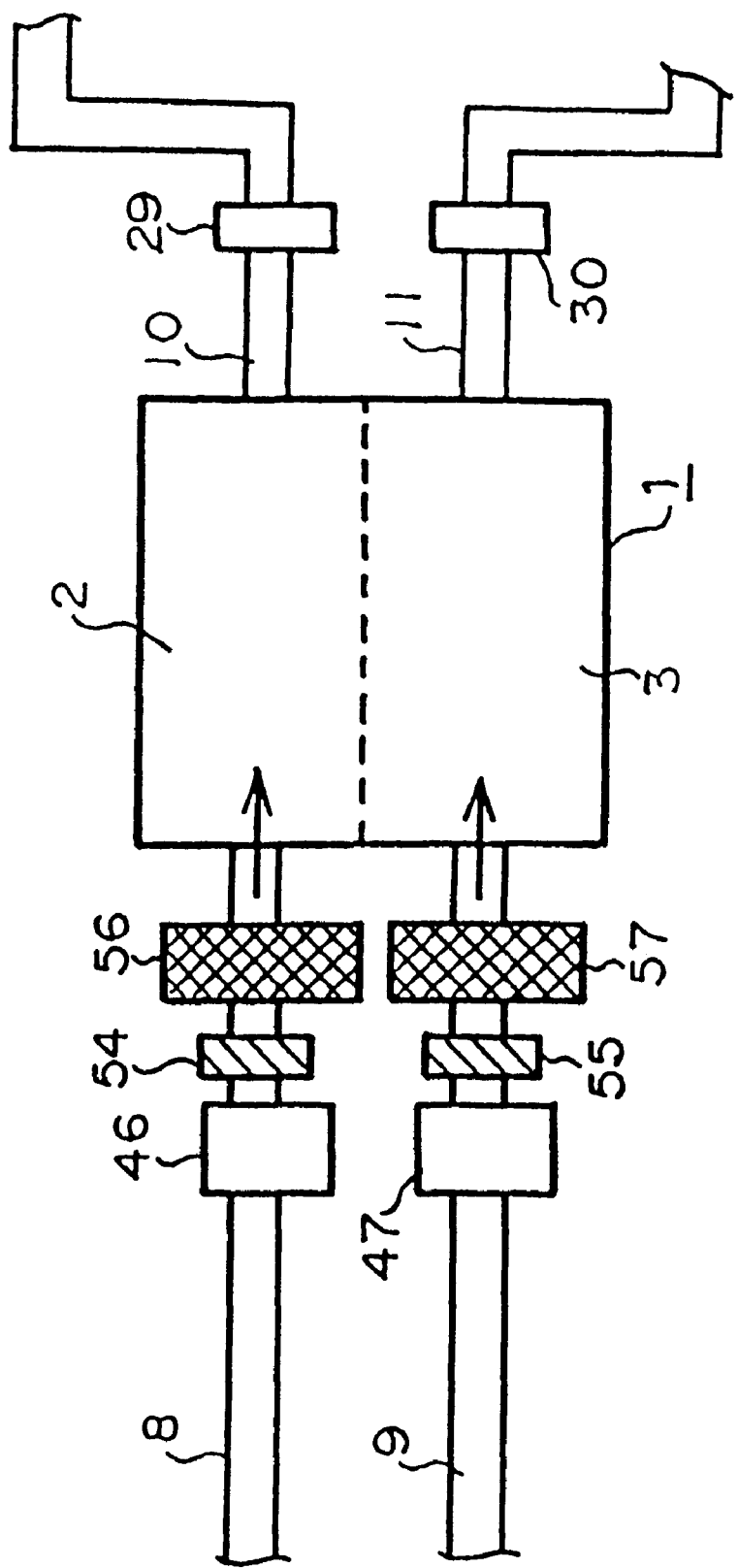
FIG. 9 is a schematic partial system diagram of an electrolytic ionic water generating apparatus of the present invention.

FIG. 9 shows another embodiment of electrolytic ionic water generation apparatus. An electrolytic tank 1 of this embodiment is basically the same as that in FIG. 1, but the positions of the pH meters and the pH controllers are different. FIG. 9 shows only the areas around the electrolytic tank 1. An electrolytic solution is made from mixing pure water with an electrolyte such as hydrochloric acid in a mixer 46, and this solution is supplied to an anode chamber 2 in the electrolytic tank 1 through a first introducing line 8. In addition, an electrolytic solution is made from mixing pure water with an electrolyte such as ammonia and hydrochloric acid in a mixer 47 and supplied to a cathode chamber 3 through a second introducing line 9.

The electrolytic ionic water, acid water and alkaline water, generated in the electrolytic tank 1 is supplied to the semiconductor substrate washing tank 39 via two discharge lines 10, 11. Semiconductor substrates in the semiconductor substrate washing tank 39 are washed by either the acid water or the alkaline water.

To control the pH of the electrolyte solution, pH meters 54, 55 measure the pH of electrolyte solution, and pH controllers 56, 57 control the pH of the electrolyte solution. The pH meters 54, 55 and the pH controllers 56, 57 are situated along the introducing lines 8, 9.

Because the electrolysis process generates heat, the pH controllers 56, 57 are controlled based on the data from the pH meters 54, 55 and based on estimated increases in temperature.

Figure 10:
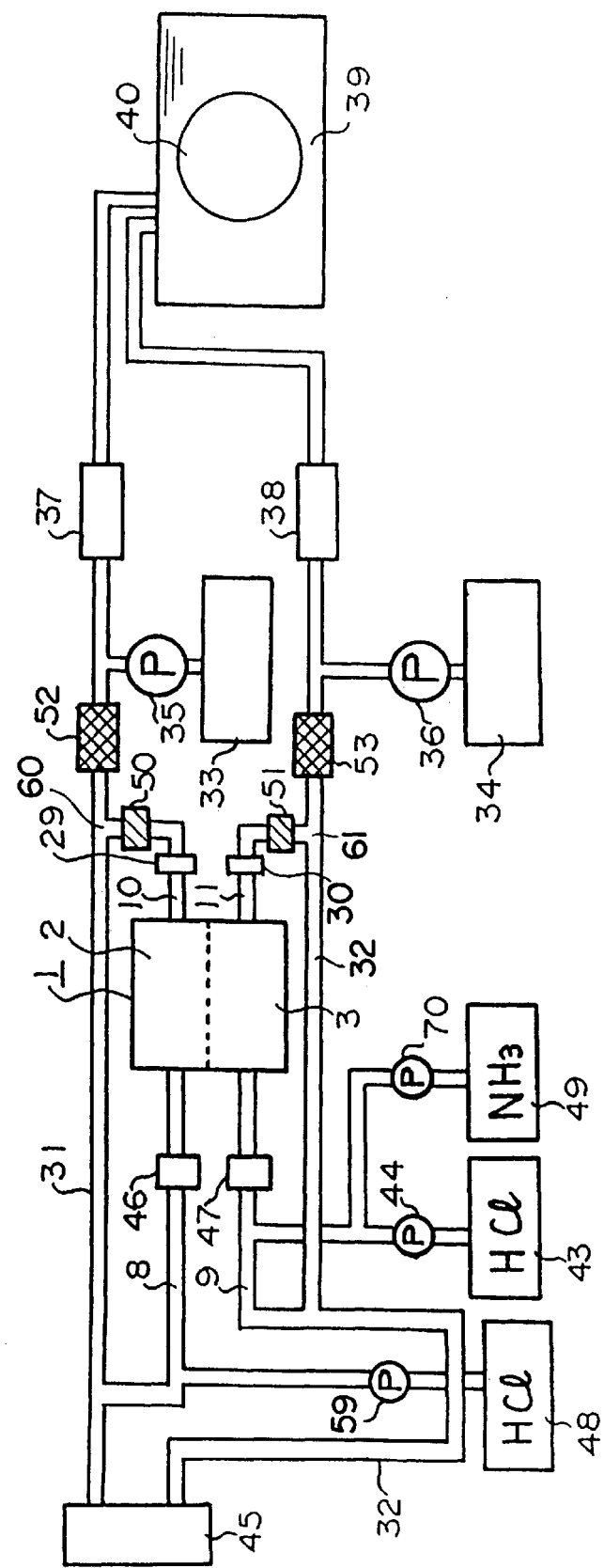
FIG. 10 is a schematic system diagram of an electrolytic ionic water generating apparatus and a cleaning device of the present invention.

FIG. 10 is a system diagram of the semiconductor manufacturing apparatus with the electrolytic ionic water generating apparatus. This system is basically the same as the system in FIG. 8 except additional pure water diluting lines 31, 32. The system is composed of the pure water tank 45, the electrolytic ionic water generating apparatus including the electrolytic tank 1 and the semiconductor substrate washing tank 39.

The pure water diluting lines 31, 32 connect the pure water tank 45 and the discharge lines 10, 11 respectively. The pH meters 29, 30 and the pH controllers 50, 51 are provided on the discharge lines 10, 11, respectively.

The acid water generated in the anode chamber 2 is diluted in the pure water line 31 so that chlorine concentration after the dilution becomes 2 ppm–20 ppm. After the solution is mixed by the mixer 37, the diluted solution is used for washing the semiconductor substrates 40. The alkaline water generated in the cathode chamber 3 is also diluted in the pure water diluting line 32 and mixed by the mixer 38. The degree of dilution is, for example, about 10–100 times.

PH meters 50, 51 for measuring the pH of electrolytic water and pH controller 52, 53 for controlling pH of electrolytic ionic water are disposed on the discharge lines 10, 11. On the first discharge line 10, the pH meter 50 is downstream from the filter 29 and the pH controller 52 is downstream from the pH meter 50. The pH controller 52 may be disposed before or after the connection point 60 between the first discharge line 10 and the pure water diluting line 31. On the second discharge line 11, the pH meter 51 is downstream from the filter 30 and the pH controller 53 is downstream from the pH meter 51. The pH controller 53 may be disposed before or after the connection point 61 between the second discharge line 11 and the pure water diluting line 32.

Even when carbon electrodes are used, carbon particles dispersed from the carbon electrodes can be suppressed in the electrolytic tank 1 with the high concentration of chlorine of about 0.1 wt % to about 10 wt % in the electrolyte solution. Filters 29, 30 are provided on the discharge lines 10, 11 to catch the carbon particles. The generated electrolytic ionic water is diluted so that the diluted water can be used for the semiconductor substrate washing. The characteristic of the diluted electrolytic ionic water is the same as that of the electrolytic ionic water generated from a weak concentration of electrolyte solution.

Therefore, according to the present invention it is possible to produce highly pure electrolytic ionic water that can be used for washing semiconductor substrates while suppressing the generation of unwanted particles and reducing metallic contamination in the electrolysis.

Figure 11:
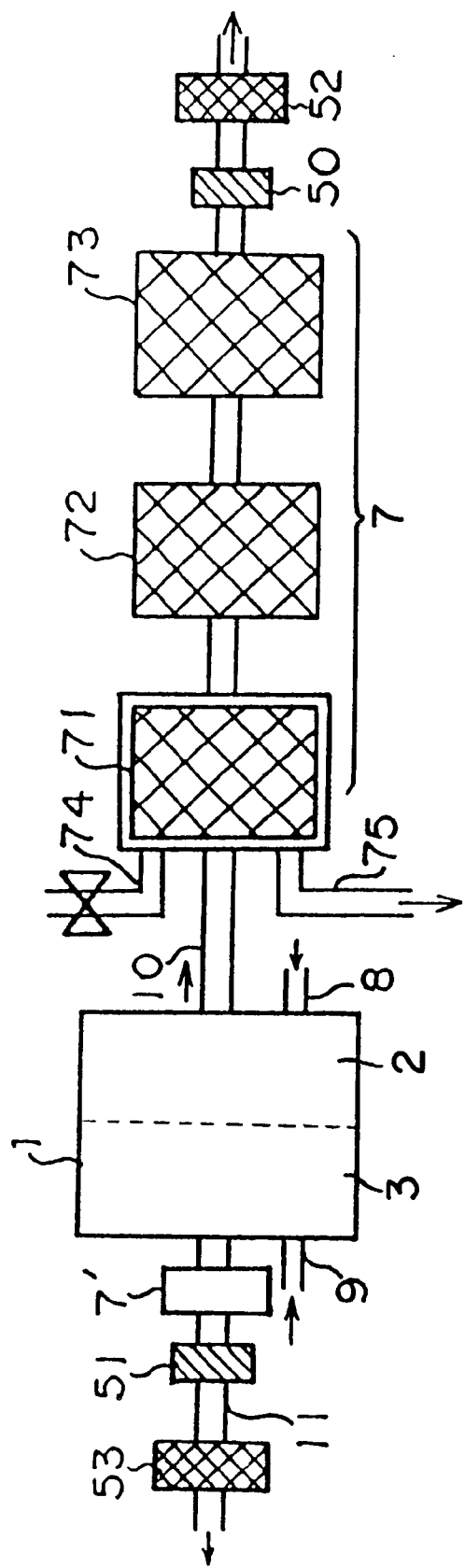
FIG. 11 is a schematic partial system diagram of an electrolytic ionic water generating apparatus of the present invention.

FIG. 11 is a schematic sectional view of another embodiment of the inventive electrolytic ionic water generating apparatus using carbon electrodes. This electrolytic ionic water generating apparatus has basically the same structure as that in FIG. 1 with the exception of the structure of the filters.

An electrolyte solution is introduced from a first introducing line 8 into an anode chamber 2 in an electrolytic tank 1 and an electrolyte solution is introduced from a second introducing line 9 into a cathode chamber 3. The solution is electrolyzed in the electrolytic tank 1, and the resulting acid water from the anode chamber 2 and alkaline water from the cathode chamber 3 are supplied through discharge lines 10, 11, respectively. The electrolytic ionic water, acid water and alkaline water, is supplied to a semiconductor manufacturing machine such as a washing semiconductor substrate apparatus or a polishing apparatus.

A high power filter group 7, which consists of filters 71, 72, 73, is disposed on the first discharge line 10 to filter electrolytic ionic water, acid water, before supplying it to a semiconductor washing apparatus, etc. A high power filter group 7', which has the same structure as filter group 7, is disposed on the second discharge line 11. Since carbon particles are generally of large size, the filter groups effectively remove the carbon particles. Ceramic filters made of for example, quartz are used for the filter groups 7, 7'. Although the filter group 7 has three filters 71, 72, 73 in FIG. 11, more filters may be disposed on the discharge lines 10, 11.

The first filter 71 is made from a first large size of quartz particles to catch a first large size of carbon particles. The second filter 72 is made from a second large size of quartz particles to catch a second large size of carbon particles. Similarly, the third filter 73 is made from a third size of quartz particles and catches a third size of carbon particles, and so on.

The first filter 71 has a pure water cleaning supply line 74 and a pure water cleaning discharge line 75. With regular cleaning of the first filter 71, the carbon particles caught by the first filter 71 are effectively removed and the life of the filter 71 can be extended. Pure water cleaning supply lines and pure water cleaning discharge lines may be provided at the second filter 72 and/or the third filter 73.

To control pH values of the electrolytic ionic water, pH meters 50, 51 and pH controllers 52, 53 are provided on the discharge lines 10, 11 after the filter groups 7, 7', respectively.

Figure 12:
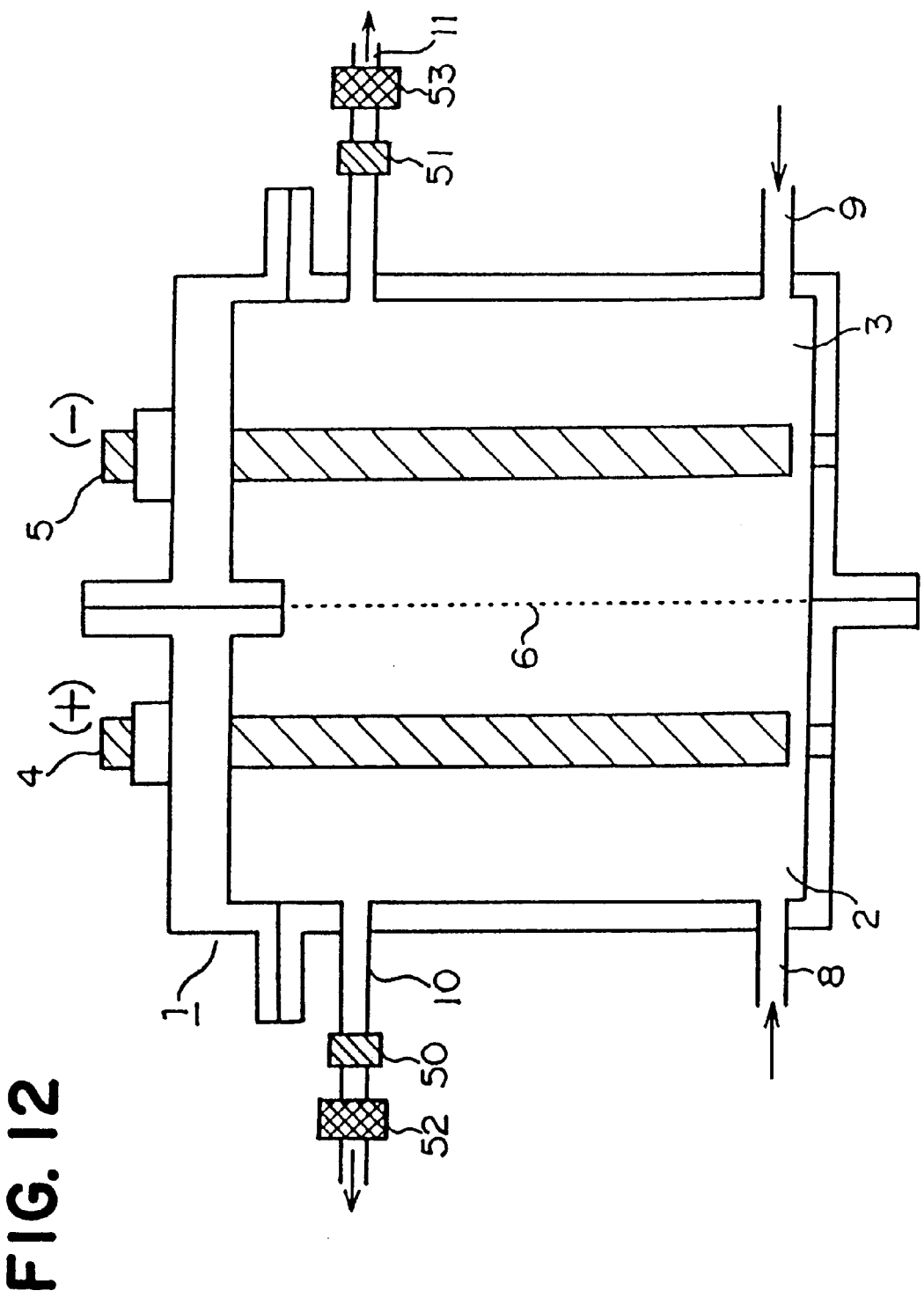
FIG. 12 is a sectional view of an electrolytic tank of the present invention.

FIG. 12 is a schematic sectional view of an electrolytic ionic water generating apparatus equipped with metallic electrodes. An electrolytic tank 1 has an anode chamber 2 and a cathode chamber 3. An anode 4 is disposed in the anode chamber 2 and a cathode 5 in the cathode chamber 3. The anode 2 and the cathode 3 consist of metals such as platinum or titanium. To efficiently separate alkaline water generated in the cathode chamber 3 and acid water generated in the anode chamber 2 from each other, the cathode chamber and the anode chamber are partitioned by a porous membrane made of such material as ceramic or a macromolecule. Electrolytic solution with supporting electrolyte such as ammonium chloride is supplied from introducing lines 8, 9 into the electrolytic tank 1.

The cathode 3 is connected to the negative pole (not shown) of a DC power source and the anode 2 is connected to its positive pole (not shown). The introduced electrolytic solution is electrolyzed with a supply voltage from the DC power source in the electrolytic tank 1. The electrolytic ionic water generated in the cathode chamber 3 is alkaline water and that generated in the anode chamber 2 is acid water. The generated electrolytic ionic water, alkaline water and acid water, is supplied to a semiconductor manufacturing apparatus such as a semiconductor washing machine and a semiconductor polishing machine through discharge lines 10, 11, respectively, as required by the particular application.

To control pH of the generated electrolytic ionic water, pH meters 50, 51 and pH controllers 52, 53 are provided on the discharge lines 10, 11, respectively.

The present invention can be used with an electrolytic ionic water generating apparatus with metallic electrodes 4, 5. Metallic ions eluted from the metallic electrodes 4, 5 gather around the electrodes 4, 5, especially the cathode 5, in the electrolytic tank 1. Thus, metallic ions contained in the generated electrolytic ionic water should be monitored.

Figure 13:
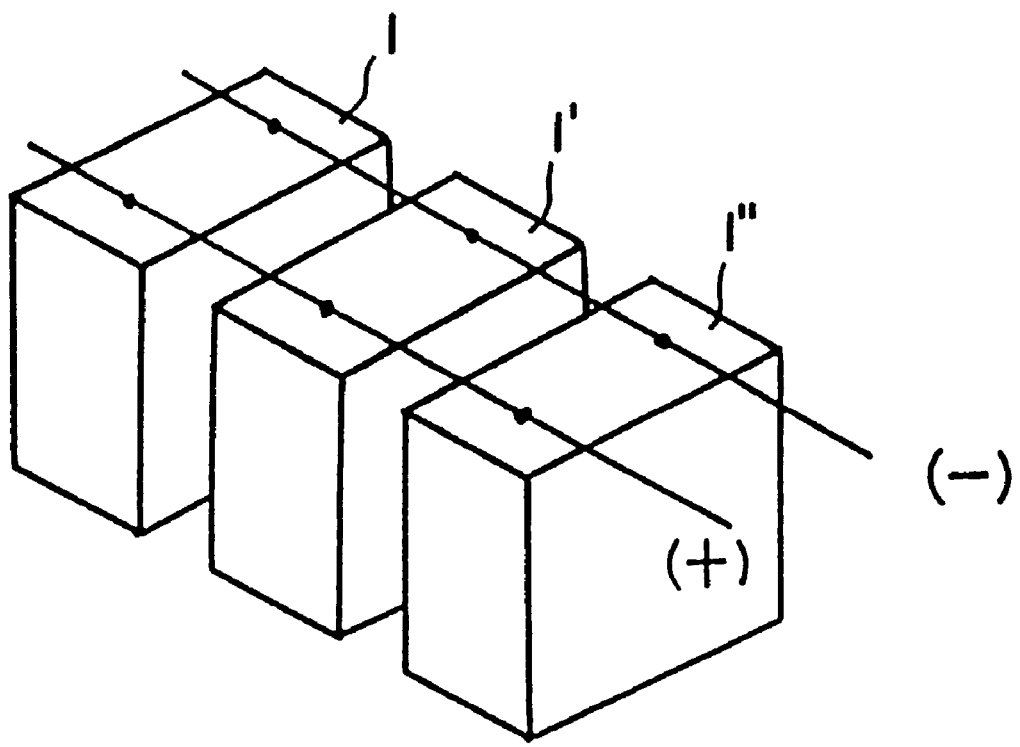
FIG. 13 is a perspective view of an electrolytic tank of the present invention.

FIG. 13 shows a perspective view of an electrolytic tank system according to the present invention. To improve the productivity, a plurality of electrolytic tanks 1, 1', 1" and so on, which have the same structure as FIG. 1, can be provided.

What is claimed is:

1. An apparatus for producing electrolyzed ionic water comprising:
   an electrolytic tank;
   a first introducing conduit to introduce a first electrolytic solution into said electrolytic tank;
   a second introducing conduit to introduce a second electrolytic solution into said electrolytic tank;
   a first discharge conduit to discharge electrolyzed acidic ionic water from said electrolytic tank;
   a second discharge conduit to discharge electrolyzed alkaline water from said electrolytic tank;
   a plurality of electrodes in said electrolytic tank;
   a barrier membrane between said electrodes;
   a power supply source connected to said electrodes, for supplying a direct current;
   a pH meter on at least one of said first discharge conduit and said second discharge conduit; and
   a pH controller downstream from said pH meter, said pH controller adapted for receiving data from said pH meter and adapted for controlling pH of the electrolyzed acidic ionic water and the electrolyzed alkali ionic water without controlling a concentration of electrolytes in at least one of said electrolyzed acidic ionic water and said electrolyzed alkali ionic water.

2. An apparatus for producing electrolyzed ionic water according to claim 1, further comprising a filter on at least one of said first discharge conduit and said second discharge conduit.

3. An apparatus for producing electrolyzed ionic water, comprising:
   an electrolytic tank;
   a first introducing conduit to introduce a first electrolytic solution into said electrolytic tank;
   a second introducing conduit to introduce a second electrolytic solution into said electrolytic tank;
   a first discharge conduit to discharge electrolyzed acidic ionic water from said electrolytic tank;
   a second discharge conduit to discharge electrolyzed alkali ionic water from said electrolytic tank;
   a plurality of electrodes in said electrolytic tank;
   a barrier membrane between said electrodes;
   a power supply source connected to said electrodes, for supplying a direct current;
   a pH meter on at least one of said first discharge conduit and said second discharge conduit; and
   a pH controller downstream from said pH meter, said pH controller adapted for receiving data from said pH meter and adapted to change the temperature of at least one of said electrolyzed acidic ionic water and said electrolyzed alkali ionic water.

4. An apparatus for manufacturing electrolyzed ionic water according to claim 3, said pH controller comprising:

a resistance coil winding around at least one of said first discharge conduit and second discharge conduit line.

5. An apparatus for producing electrolyzed ionic water according to claim 3, said pH controller comprising:
a cooling or heating medium surrounding at least one of said first discharge conduit and said second discharge conduit.

6. An apparatus for producing electrolyzed ionic water according to claim 3, said pH controller comprising:
a resistance coil in a tube dipped in at least one of said first discharge conduit and said second discharge conduit.

7. An apparatus for producing electrolyzed ionic water according to claim 3, said pH controller comprising:
a cooling or heating medium passing through a tube dipped in at least one of said first discharge conduit and said second discharge conduit.

8. An apparatus for producing electrolyzed ionic water according to claim 3, wherein a pair of electrodes is disposed in said electrolytic tank.

9. An apparatus for producing electrolyzed ionic water according to claim 3, wherein said first electrolytic solution contains ammonia.

10. An apparatus for producing electrolyzed ionic water according to claim 3, wherein said second electrolytic solution contains ammonia.

11. An apparatus for producing electrolyzed ionic water according to claim 10, wherein said second electrolytic solution further contains hydrochloric acid.

12. An apparatus for producing electrolyzed ionic water comprising:
a plurality of apparatuses according to claim 3.

13. An apparatus for producing electrolyzed ionic water comprising:
an electrolytic tank;
a first introducing conduit to introduce a first electrolytic solution into said electrolytic tank;
a second introducing conduit to introduce a second electrolytic solution into said electrolytic tank;
a first discharge conduit to discharge electrolyzed acidic ionic water from said electrolytic tank;
a second discharge conduit to discharge electrolyzed alkali ionic water from said electrolytic tank;
a plurality of electrodes in said electrolytic tank;
a barrier membrane between said electrodes;
a power supply source connected to said electrodes, for supplying a direct current;
a pH meter on at least one of said first discharge conduit and said second discharge conduit; and
a pH controller downstream from said pH meter, said pH controller receiving data from said pH meter, wherein said electrodes are made from carbon coated by an amorphous carbon coat layer.

14. An apparatus for producing electrolyzed ionic water according to claim 13, wherein said first electrolytic solution and said second electrolytic solution contain HF.

15. An apparatus for producing electrolyzed ionic water according to claim 13, further comprising:
a filter group on at least one of said first discharge conduit and said second discharge conduit.

16. An apparatus for producing electrolyzed ionic water according to claim 15, wherein said filter group comprises a plurality of filters to catch different size particles.

17. An apparatus for producing electrolyzed ionic water according to claim 15, wherein said filter group comprises a cleaning liquid supply conduit and a cleaning liquid discharge conduit.

18. An apparatus for producing electrolyzed ionic water according to claim 13, wherein said amorphous carbon coat layer is formed by dipping in an amorphous carbon bath filled with carbon in an organic solvent.

19. An apparatus for producing electrolyzed ionic water comprising:
an electrolytic tank;
a first introducing conduit to introduce a first electrolytic solution into said electrolytic tank;
a second introducing conduit to introduce a second electrolytic solution into said electrolytic tank;
a first discharge conduit to discharge electrolyzed acidic ionic water from said electrolytic tank;
a second discharge conduit to discharge electrolyzed alkali ionic water from said electrolytic tank;
a plurality of electrodes in said electrolytic tank;
a barrier membrane between said electrodes;
a power supply source connected to said electrodes, for supplying a direct current;
a pH meter on at least one of said first introducing conduit and said second introducing conduit;
a pH controller downstream from said pH meter before said electrolytic tank, said pH controller receiving data from said pH meter.

20. An apparatus for producing electrolyzed ionic water according to claim 19, wherein said pH controller changes the temperature of at least one of said electrolyzed acid ionic water and said electrolyzed alkali ionic water, in relation to said data from said pH meter and estimated heat resulting from the electrolysis.

21. A method for producing electrolyzed ionic water, comprising the steps of:
detecting a pH value of electrolyzed ionic water; and
changing a temperature of said electrolyzed ionic water based on a result of said detecting step.

22. A method for producing electrolyzed ionic water using a electrolytic tank having a discharge conduit to discharge said electrolyzed ionic water to an external apparatus, a pH meter on said discharge conduit and a pH controller, comprising the steps of:
detecting a pH value of an electrolyzed ionic water on said discharge conduit by said pH meter;
changing the temperature of said electrolyzed ionic water by said pH controller based on the result of said detecting step.

23. A method for producing electrolyzed ionic water according to claim 22, further comprising the step of supplying said electrolyzed ionic water to a semiconductor manufacturing device through said discharge conduit.

24. An apparatus for manufacturing a semiconductor device comprising:
an electrolytic tank;
a first introducing conduit to introduce a first electrolytic solution into said electrolytic tank;
a second introducing conduit to introduce a second electrolytic solution into said electrolytic tank;
a first discharge conduit to discharge electrolyzed acidic ionic water from said electrolytic tank;
a second discharge conduit to discharge electrolyzed alkali ionic water from said electrolytic tank;
a plurality of electrodes in said electrolytic tank;

a barrier membrane between said electrodes;

a power supply source connected to said electrodes, for supplying a direct current;

a pH meter on at least one of said first discharge conduit and said second discharge conduit;

a pH controller downstream from said pH meter, said pH controller receiving data from said pH meter and changing the temperature of at least one of said electrolyzed acidic ionic water and the said electrolyzed alkali ionic water; and a washing tank connected to at least one of said first discharge conduit and said second discharge conduit.

25. An apparatus for manufacturing a semiconductor device according to claim 24, further comprising:

a pure water tank connected to said first introducing conduit and said second introducing conduit, to introduce pure water to said electrolytic tank.

26. An apparatus for manufacturing a semiconductor device according to claim 24, wherein said first electrolytic solution contains hydrochloric acid.

27. An apparatus for manufacturing a semiconductor device according to claim 24, wherein said second electrolytic solution contains ammonia.

28. An apparatus for manufacturing a semiconductor device according to claim 27, wherein said second electrolytic solution further contains hydrochloric acid.

29. An apparatus for manufacturing a semiconductor device according to claim 24, further comprising:

a pure water discharge conduit connected to at least one of said first discharge conduit and said second discharge conduit to dilute said electrolyzed water.

30. An apparatus for manufacturing a semiconductor device according to claim 24, wherein said first electrolytic solution and said second electrolytic solution contain HF.

* * * * *